United States Patent
Minkin

(10) Patent No.: US 7,999,821 B1
(45) Date of Patent: Aug. 16, 2011

(54) RECONFIGURABLE DUAL TEXTURE PIPELINE WITH SHARED TEXTURE CACHE

(75) Inventor: Alexander L. Minkin, Los Altos, CA (US)

(73) Assignee: NVIDIA Corporation, Santa Clara, CA (US)

(*) Notice: Subject to any disclaimer, the term of this patent is extended or adjusted under 35 U.S.C. 154(b) by 907 days.

(21) Appl. No.: 11/960,645

(22) Filed: Dec. 19, 2007

Related U.S. Application Data

(60) Provisional application No. 60/870,612, filed on Dec. 19, 2006.

(51) Int. Cl.
*G09G 5/00* (2006.01)

(52) U.S. Cl. ........ 345/582; 345/506; 345/519; 345/552; 345/557; 345/606; 345/608; 345/609; 382/260

(58) Field of Classification Search .................. 345/608, 345/609
See application file for complete search history.

(56) References Cited

U.S. PATENT DOCUMENTS

| | | | |
|---|---|---|---|
| 6,005,582 A | 12/1999 | Gabriel et al. | |
| 6,664,971 B1 | 12/2003 | Mukherjee et al. | |
| 6,756,989 B1 | 6/2004 | Morgan et al. | |
| 6,778,181 B1 | 8/2004 | Kilgariff et al. | |
| 6,924,811 B1 | 8/2005 | Minkin | |
| 6,947,054 B2 | 9/2005 | Spangler | |
| 7,027,063 B1 | 4/2006 | Minkin | |
| 7,167,183 B1 | 1/2007 | Donovan et al. | |
| 7,202,871 B2 * | 4/2007 | Margittai et al. | 345/535 |
| 7,525,551 B1 | 4/2009 | Newhall et al. | |
| 7,884,831 B2 * | 2/2011 | Minkin et al. | 345/582 |
| 2002/0126133 A1 | 9/2002 | Ewins | |
| 2004/0119720 A1 | 6/2004 | Spangler | |
| 2004/0257376 A1 | 12/2004 | Liao et al. | |
| 2007/0229530 A1 | 10/2007 | Marshall et al. | |
| 2008/0211827 A1 | 9/2008 | Donovan et al. | |

OTHER PUBLICATIONS

U.S. Appl. No. 11/556,674 filed Nov. 3, 2006.

* cited by examiner

*Primary Examiner* — Antonio Caschera
(74) *Attorney, Agent, or Firm* — Kilpatrick Townsend & Stockton LLP

(57) ABSTRACT

Circuits, methods, and apparatus that provide texture caches and related circuits that store and retrieve texels in an efficient manner. One such texture circuit can provide a configurable number of texel quads for a configurable number of pixels. For bilinear filtering, texels for a comparatively greater number of pixels can be retrieved. For trilinear filtering, texels in a first LOD are retrieved for a number of pixels during a first clock cycle, during a second clock cycle, texels in a second LOD are retrieved. When aniso filtering is needed, a greater number of texels can be retrieved for a comparatively lower number of pixels.

14 Claims, 15 Drawing Sheets

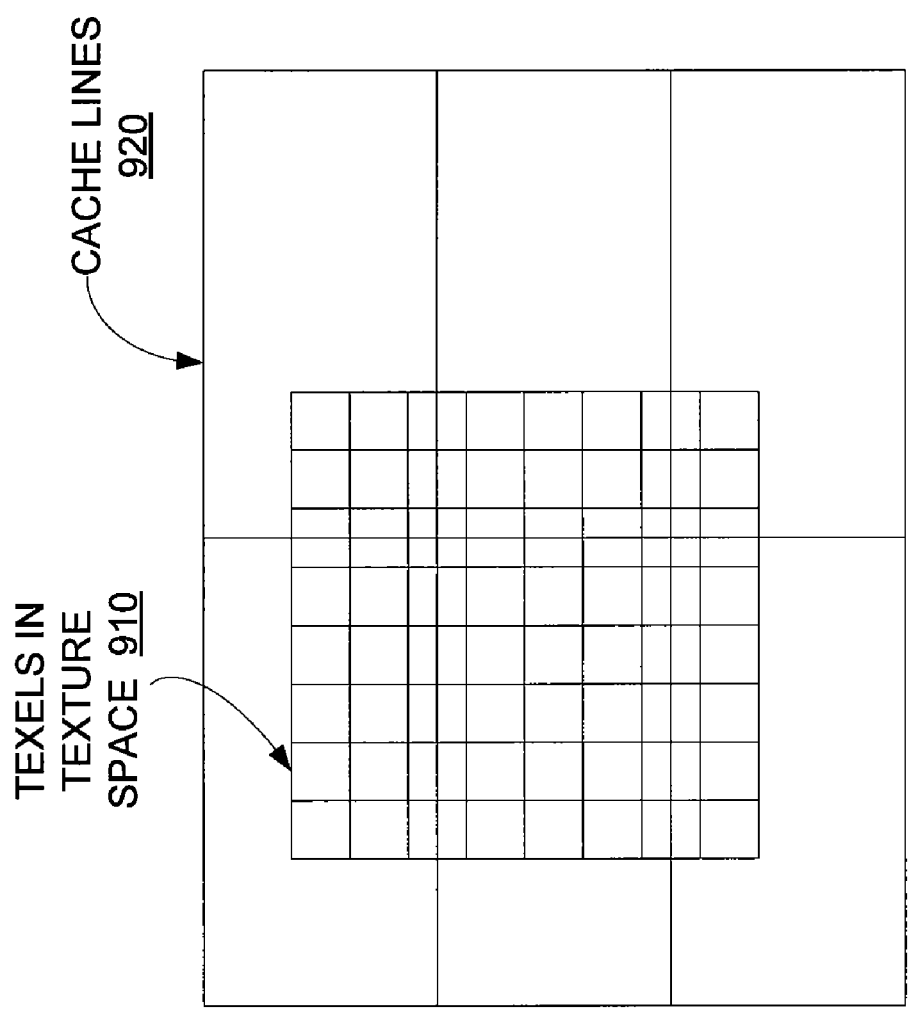

Figure 9B

RECONFIGURABLE DUAL TEXTURE PIPELINE WITH SHARED TEXTURE CACHE

CROSS-REFERENCES TO RELATED APPLICATIONS

This application claims the benefit of U.S. provisional patent application No. 60/870,612, filed Dec. 19, 2006, and is related to co-pending U.S. patent application Ser. No. 11/556,674, filed Nov. 3, 2006, which are both incorporated by reference.

BACKGROUND

The present invention relates generally to texture pipelines for graphics processing, and more specifically to reconfigurable, high-performance dual texture pipelines with a shared texture cache.

The complexity and realism of graphics images has increased tremendously during the past few years, yet the demand for further increases shows no signs of abating. Accordingly, the amount of data that needs to be processed to generate graphics images for games, commercial applications, and other uses will continue to grow for the foreseeable future.

Textures are one type of data that is processed by graphics processors in increasing numbers. Textures provide surface patterns and colors for objects in graphics images. These textures are made up of individual units referred to as texels. Typically, one or more groups of texels in one or more texture levels map into each pixel that is displayed. Each group of texels is filtered by a texture filter, then used in generating the color values and transparency for the corresponding pixel.

There are several types of filtering that may be used. Commonly, one pixel maps into a set of four texels arranged in a two by two array. Such an array of texels is referred to as a texel quad. The filtering or averaging of these four texels is referred to as bilinear filtering.

Often, different sizes of a texture, referred to as different levels of detail, or LODs, are used. Larger textures are used for objects that appear to be closer to a viewer; the smaller textures are for more distant objects. On occasion, a location between two LODs maps into a pixel. In such a case, two texel quads, one from each LOD, are filtered in a process referred to as trilinear filtering.

Also, a region of texels that includes more than one texel quad in one texture level may map into a pixel. The processing of these texel quads is referred to as aniso filtering. For example, if two texel quads map into a pixel, 2:1 aniso filtering is needed. On occasion, 4:1, 6:1, 8:1, and other aniso ratios may be used.

Texels are stored in a cache memory and retrieved as needed. When trilinear or higher orders of aniso filtering are needed, greater numbers of texel quads need to be retrieved from the cache memory. If the cache memory is inefficient in delivering these texel quads, image processing is slowed or degraded. Thus, what is needed are circuits, methods, and apparatus that efficiently store and retrieve texels for these different types of filtering.

SUMMARY

Accordingly, embodiments of the present invention provide circuits, methods, and apparatus that include texture caches and related circuits that store and retrieve texels in a fast and efficient manner.

One exemplary embodiment of the present invention provides a texture cache that is shared between two texture pipelines. This shared texture cache outputs an increased number of texel quads for each pixel in a group of pixels each clock cycle. In a specific embodiment, this group of pixels may include up to two pixel quads of four pixels each, for a total of eight pixels. The texture pipeline can be reconfigured to retrieve and process different numbers of texel quads for different numbers of pixels each clock cycle based on the size of the texels and the type of filtering to be performed. In each clock cycle, all needed texel quads may be retrieved for each pixel in two pixel quads, all needed texel quads may be retrieved for less than all of the pixels in each of two pixel quads, less than all needed texel quads may be retrieved for all pixels in two pixel quads, or less than all needed texel quads may be retrieved for less than all pixels in each of two pixel quads.

In a specific embodiment of the present invention, for texels up to a certain size, eight texel quads, 32 texels total, are provided each clock cycle. For texels up to this certain size, during each clock cycle, the cache may provide one texel quad for each pixel in two pixel quads for bilinear filtering, one texel quad for each pixel in two pixel quads for trilinear filtering, two texel quads for each pixel in one pixel quad for 2:1 aniso filtering, or four texel quads for two pixels in one pixel quad for 4:1 or higher ratio aniso filtering. When texels are larger than this certain size, fewer texel quads are retrieved each clock cycle, texel quads are retrieved for fewer pixels, or both. In other embodiments of the present invention, other numbers of texel quads can be retrieved for other numbers of pixels in each clock cycle.

In another exemplary embodiment of the present invention, one cache line can be read from each set in a texture cache in a clock cycle. If a pixel quad requires texels from two or more cache lines in the same set, two or more clock cycles are needed. Accordingly, texel quads are retrieved from a texture cache in a manner that reduces these conflicts. For example, in a specific embodiment of the present invention, two texel quads are retrieved for each pixel in one pixel quad each clock cycle when the aniso ratio is 2:1. This reduces conflicts as compared to retrieving one texel quad for each pixel in each of two pixel quads each clock cycle.

In another exemplary embodiment of the present invention, a texture cache is arranged in a number of banks. Each bank has one read and one write port, though in other embodiments, other numbers of read and write ports can be used. Data is stored in cache lines, where each cache line is spread among the banks. Different cache lines can be addressed for each bank in the cache memory, that is, each bank is independently addressable. If data is needed from two or more locations in one bank, the read accesses are serialized and executed in two or more clock cycles.

Various embodiments of the present invention may incorporate these and the other features described herein. A better understanding of the nature and advantages of the present invention may be gained by reference to the following detailed description and the accompanying drawings.

BRIEF DESCRIPTION OF THE DRAWINGS

FIG. 9A illustrates cache line coverage of a texture space according to an embodiment of the present invention, while FIG. 9B illustrates the arrangement of sets in a cache memory according to an embodiment of the present invention;

DESCRIPTION OF EXEMPLARY EMBODIMENTS

Figure 1:
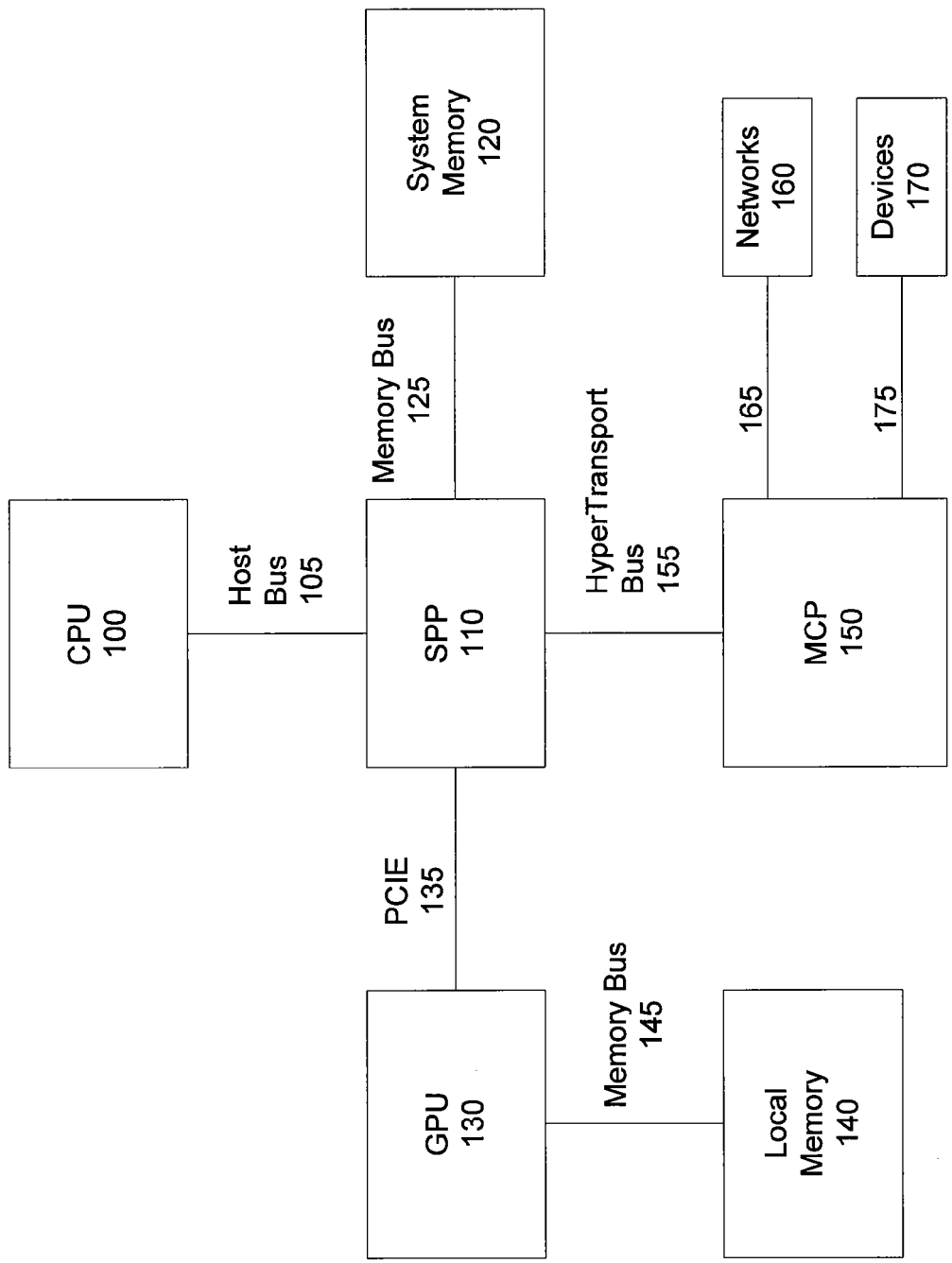
FIG. 1 is a block diagram of a computing system that is improved by incorporating an embodiment of the present invention.

FIG. 1 is a block diagram of a computing system that is improved by incorporating an embodiment of the present invention. This block diagram includes a central processing unit (CPU) or host processor 100, system platform processor (SPP) 110, system memory 120, graphics processing unit (GPU) 130, local memory 140, media communications processor (MCP) 150, networks 160, and internal and peripheral devices 170.

The CPU 100 connects to the SPP 110 over the host bus 105. The SPP 110 is in communication with the graphics processing unit 130 over a PCIE connection 135. The SPP 110 reads and writes data to and from the system memory 120 over the memory bus 125. The MCP 150 communicates with the SPP 110 via a high-speed connection, such as a Hyper-Transport bus 155, and connects network 160 and internal and peripheral devices 170 to the remainder of the computer system. The graphics processing unit 130 receives data over the PCIE connection 135 and generates graphic and video images for display over a monitor or other display device (not shown). The graphics processing unit 130 stores fragment and other graphics data in the local memory 140.

The CPU 100 may be a processor, such as those manufactured by Intel Corporation or other supplier, and is well-known by those skilled in the art. The SPP 110 and MCP 150 are commonly referred to as a chipset, and each is typically an integrated circuit. These may alternately be Northbridge and Southbridge devices. The system memory 120 is often a number of dynamic random access memory devices arranged in dual in-line memory modules (DIMMs). The graphics processing unit 130, SPP 110, and MCP 150 are preferably manufactured by NVIDIA Corporation.

The graphics processing unit 130 and local memory 140 may be located on a daughter board or graphics card, while the CPU 100, system platform processor 110, system memory 120, and media communications processor 150 may be located on a computer system motherboard. The graphics card is typically a printed-circuit board with the graphics processing unit 130 and local memory 140 attached. The printed-circuit board typically includes a connector, for example, a PCIE connector attached to the printed-circuit board that fits into a PCIE slot included on the motherboard.

A computer system, such as the illustrated computer system, may include more than one GPU 130. Additionally, each of these graphics processing units may be located on a separate graphics card. Two or more of these graphics cards may be joined together by a jumper or other connection. This technology, the pioneering SLI™, has been developed by NVIDIA Corporation. In other embodiments of the present invention, one or more GPUs may be located on one or more graphics cards, while one or more others are located on the motherboard.

While this embodiment provides a specific type computer system that may be improved by the incorporation of an embodiment of the present invention, other types of electronic or computer systems may also be improved. For example, video and other game systems, navigation, set-top boxes, pachinko machines, and other types of electronic systems may be improved by the incorporation of embodiments of the present invention. While embodiments of the present invention are well suited to graphics processing units, other types of graphics processors, as well as other processors, may benefit from the incorporation of an embodiment of the present invention. For example, multi or general-purpose processors, or other processors, such as integrated graphics processors or general-purpose graphics processing units, may benefit from the incorporation of an embodiment of the present invention.

Also, while these types of computer systems, and the other electronic systems described herein, are presently commonplace, other types of computer and electronic systems are currently being developed, and others will be developed in the future. It is expected that many of these may also be improved by the incorporation of embodiments of the present invention. Accordingly, the specific examples listed are explanatory in nature and do not limit either the possible embodiments of the present invention or the claims.

Again, textures provide surface patterns and colors for objects located in a graphics image. These textures can be referred to as a texture space, and are formed from individual texels. Textures are applied to structures by mapping individual pixels into a texture space. Typically a pixel maps into four or more texels, which are filtered and applied to the pixel. Examples of types of filtering are shown below.

Figure 2A:
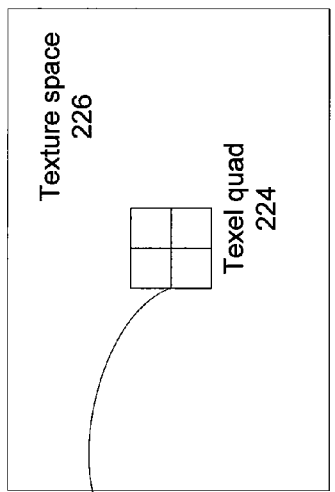
FIGS. 2A-D illustrate types of filtering that are performed in an efficient manner by an embodiment of the present invention.
Figure 2B:
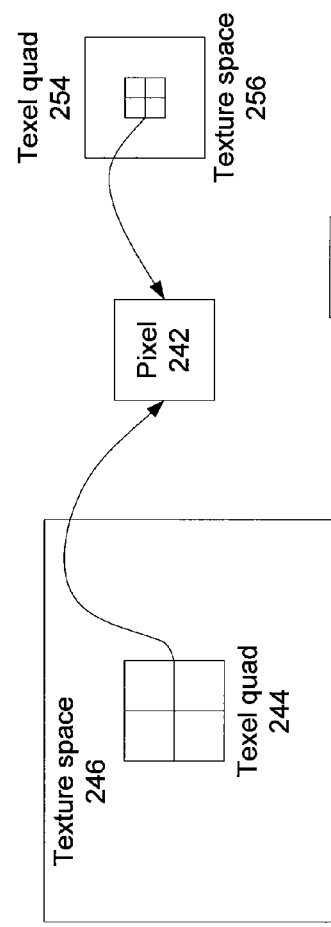
Figure 2C:
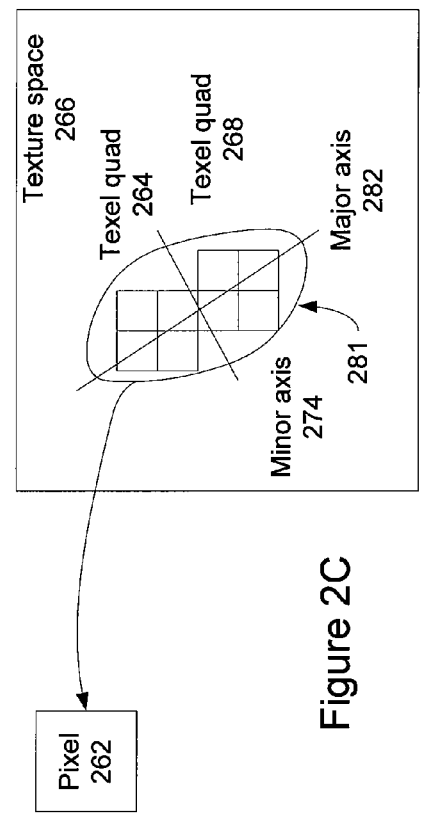

FIGS. 2A-C illustrate types of filtering that are performed in an efficient manner by an embodiment of the present invention. FIG. 2A illustrates an example of bilinear filtering that may be performed in an efficient manner by an embodiment of the present invention. In bilinear filtering, four texels, a texel quad, are provided to a bilinear interpolation circuit, or bilerp, which filter them and outputs the result. The texels may be, for example, 4, 8, 16, 32, 64, 128, or other bits in size. Embodiments of the present invention provide bilerps that are configurable to filter texel quads having these different precisions. In a specific embodiment of the present invention, a bilerp can filter texels having four components of up to eight bits or 32 bits in total. These bilerps can be combined to filter texels having higher resolution. The filtered result is then used to provide texture for a pixel. In this specific example, texel quad 224, located in a texture 226, maps into pixel 222. The four texels that form the texel quad 224 are used to determine the color of pixel 222. Specifically, during filtering these four texels are averaged and used to provide texture information for the pixel 222.

Mipmapping is used to give depth perspective to a graphics image. In mipmapping, textures are replicated in various sizes and stored in memory. Each size is referred to as a level of detail or LOD, or alternately as a miplevel. The smaller versions of these textures may be used to provide texture for distant objects, while larger versions may be used to provide texture objects that appear to be closer. At times, it is desirable to interpolate between two LODs. Trilinear filter is used to accomplish this.

FIG. 2B illustrates an example of trilinear filtering that may be performed in an efficient manner by an embodiment of the present invention. This figure illustrates a pixel 242 receiving texture from texel quads at two different LODs. In this example, pixel 242 receives texture from a texel quad 244 in miplevel 246 and texel quad 254 in miplevel 256. These texels can be retrieved from a texture cache and filtered to provide texture for pixel 242.

Embodiments of the present invention also support aniso filtering, where one pixel receives texture from two or more texel quads in one miplevel. The number of texel quads used to provide texture for a pixel is referred to as the aniso ratio. For example, in 2:1 aniso filtering, two texel quads are used to provide texture for a pixel. Other types of aniso filtering, that is, aniso ratios, such as 4:1, 6:1, 8:1, and others are also supported by embodiments of the present invention.

FIG. 2C is an example of 2:1 aniso filtering that may be performed in an efficient manner by an embodiment of the present invention. In this example, pixel 262 corresponds to an ellipse 281 in texture space 266. The ellipse 281 has a minor axis 274 and a major axis 282. The ratio of the major axis to the minor axis is the aniso ratio. In this example, pixel 262 is textured using texel quads 264 and 268 in texture space 266, thus 2:1 aniso filtering is used to determine the texture for pixel 262.

Figure 2D:
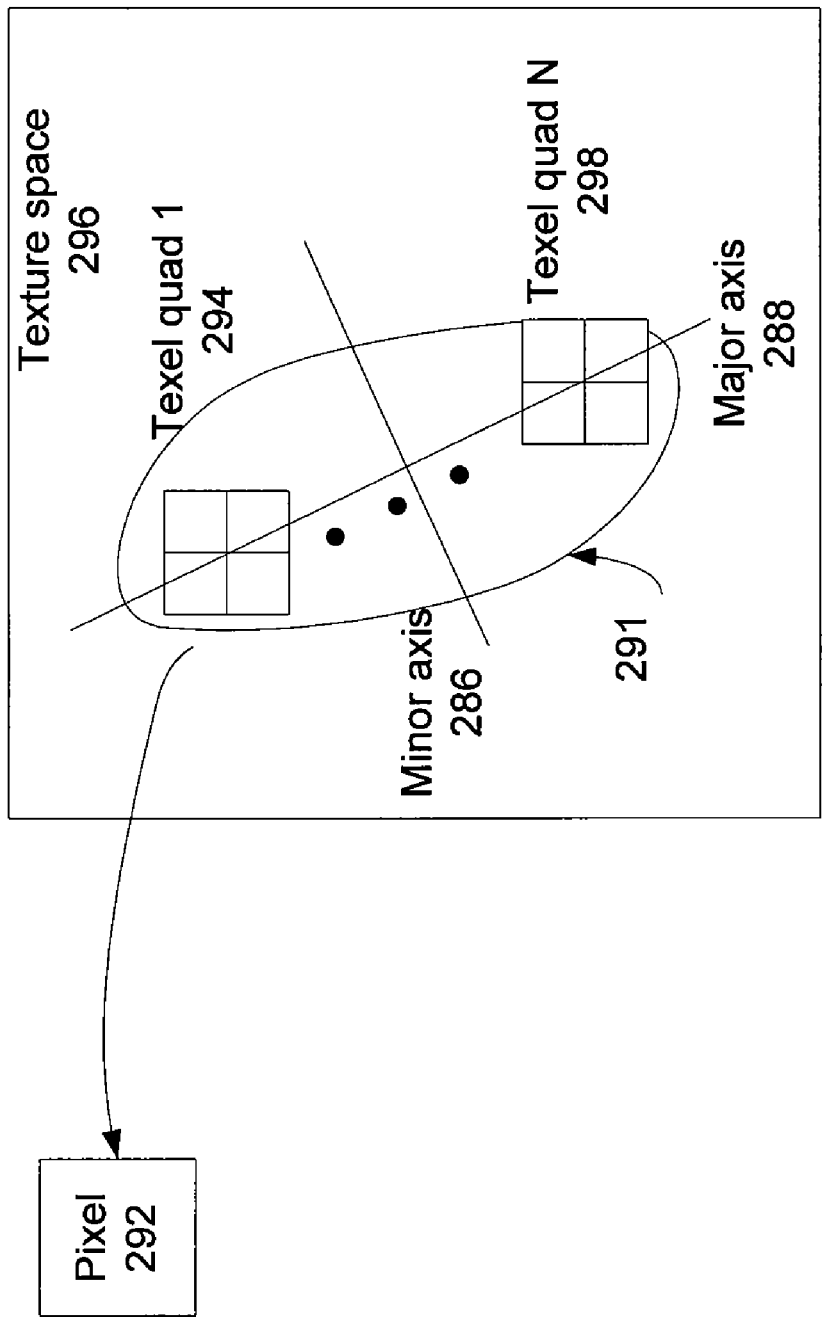

Other aniso ratios are possible and are supported by embodiments of the present invention. FIG. 2D is a general example of N:1 aniso filtering that may be performed in an efficient manner by an embodiment of the present invention. In this example, pixel 292 corresponds to an ellipse or region 291 in texture space 296. The ellipse 291 has a minor axis 286 and a major axis 288. Again, the ratio of the major axis to the minor axis is the aniso ratio. In this example, pixel 292 is textured using N texel quads 294 through 288 in texture space 296, thus N:1 aniso filtering is used to determine the texture for pixel 292.

A graphics image often includes pixels requiring each of these types of filtering. For example, 50% of the pixels in a graphics image may require bilinear filtering, 20% may require trilinear filtering, while the other 30% may require some level of aniso filtering. As can be seen from the above examples, trilinear and aniso filtering require more texels to be filtered for each pixel than bilinear filtering. As a result, when the number of pixels requiring trilinear and the ratio of aniso filtering increase, image processing slows. Accordingly, embodiments of the present invention provide a greater number of texels each clock cycle. These texels are provided in a highly configurable manner. Various sized texels can be provided, and they may be provided at various times to differing numbers of pixels in differing number of pixel quads, such that efficiency of the texture pipelines and associated cache remains high.

Conventional devices provide retrieval and filtering of one texel quad for each pixel in a pixel quad per clock cycle, that is, four texel quads per clock. However, as can be seen above, trilinear filtering and 2:1 aniso filtering requires two texel quads for each pixel, and higher ratio filtering requires even more. Accordingly, a specific embodiment of the present invention provides dual texture pipelines that share a cache that can retrieve and filter up to eight texel quads per clock cycle. In this embodiment, up to two pixel quads, eight pixels, can be received each clock cycle. The eight texel quads are allocated among the eight pixels in a variety of ways that are optimized for efficient texel retrieval from cache. For example, one texel quad can be retrieved for each pixel in two pixel quads, two texel quads can be retrieved for each pixel in one pixel quad in one clock cycle, or four texel quads can be retrieved for two pixels in one pixel quad. In some embodiments of the present invention, if the texels to be retrieved are comparatively large, then fewer texel quads are retrieved for each pixel, texel quads are retrieved for fewer pixels, or both. Other configurations can be supported by embodiments of the present invention as well.

Embodiments of the present invention store and retrieve data using a texture cache located in a texture pipeline. But not all texel data that may be needed can be stored in a texture cache, to do so is not currently cost effective since the texture cache would be prohibitively large. Thus, other levels of memory, such as a second level or L2 cache and a graphics or system memory, may be used to store texture data. Accordingly, when receiving a request for a texel, the cache first determines whether it is currently stored in the texture cache, or whether it needs to be retrieved from another memory. In an exemplary embodiment of the present invention, a first number of texture pipelines access a second number of L2 cache memories via a crossbar circuit. Each L2 cache memory can further access system or graphics memory via a frame buffer interface. An example is shown in the following figure.

Figure 3:
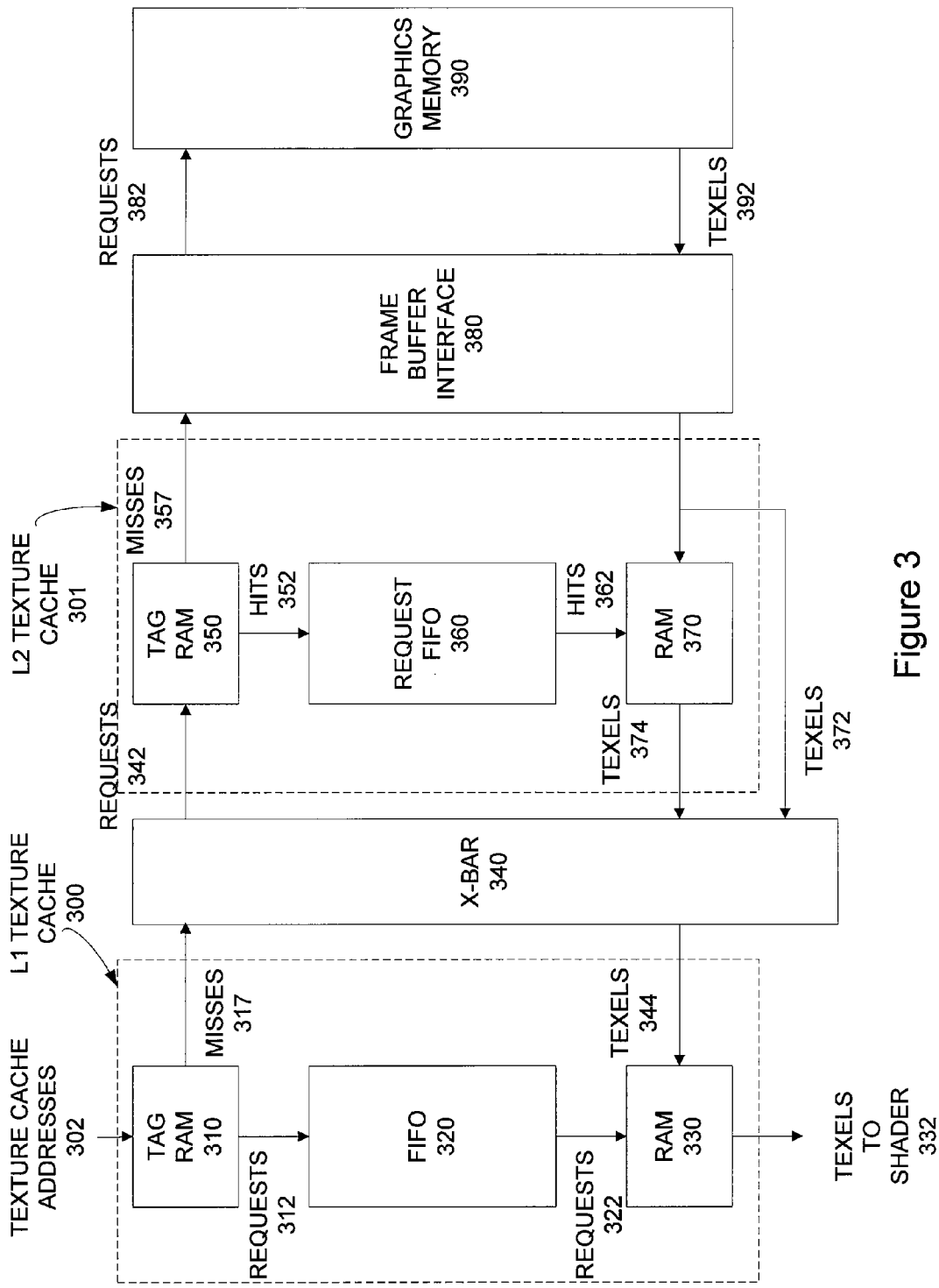
FIG. 3 is a block diagram of a portion of a dual texture pipeline cache communicating with an L2 cache in a partition via a crossbar according to an embodiment of the present invention.

FIG. 3 is a block diagram of a portion of a dual texture pipeline communicating with an L2 cache in a partition via a crossbar according to an embodiment of the present invention. This figure includes level-one texture cache 300 that includes a tag RAM 310, FIFO or other buffer 320, and RAM 330, a crossbar 340, and a partition including a level-two cache 301 that includes tag RAM 350, request FIFO 360, and RAM 370, as well as a frame buffer interface 380 that communicates with a graphics memory 390. Typically, several texture caches communicate with several partitions via the crossbar 340, though only one texture cache and one partition are shown for simplicity.

Requests are received from the shader by the texture pipeline. Texture cache addresses are received from the texture pipeline on line 302 by the tag RAM 310. The tag RAM 310 determines whether the needed texels are stored in the texture cache or need to be retrieved from the partitions. If the needed texels are not stored in the texture cache, the tag RAM 310 provides the request on line 317 to the crossbar 340. The tag RAM 310 provides each request, hit or miss, on line 312 to the FIFO 320.

The FIFO 320 queues the requests, giving the partitions time to provide missing texels on line 344 to the RAM 330. As requests emerge from the FIFO 320 on line 322, the appropriate texels are read from the RAM 330 and provided to the shader on line 322.

Requests for missing texels are provided by the crossbar 340 to the appropriate partition on line 342. The tag RAM 350 receives the requests on line 342 and determines whether the needed texels are available in the L2 cache. If the texels are not available in the L2 cache, the tag RAM 350 requests the data from the frame buffer interface 380. If the data is available in the second level cache, the tag RAM 350 provides the request to a hit FIFO 360 on line 352.

Frame buffer interface 380 provides requests on line 382 to the graphics memory or DRAM 390, which provides texels back to frame buffer interface 380 on line 392. The frame buffer interface provides these texels to the RAM 370 and directly to the crossbar 340 on line 372. In this way, the crossbar 340 does not need to wait for data to be read from the RAM 370. Requests that are hits emerge from the hit FIFO 360 on line 362, and corresponding texels are read from the RAM 370 and provided on line 374 to the crossbar 340. The crossbar 340 then provides the texels to the appropriate texture cache on line 344.

Again, a larger number of texels is needed for each pixel for trilinear or aniso filtering. Accordingly, embodiments of the present invention provide a texture cache that provides a greater number of texels in a highly flexible and efficient manner. Also, embodiments of the present invention employ a large number of texture pipelines to process the large number of texels required. Much of the data needed by these pipelines is shared. It would be redundant to have separate caches for each pipeline, since a large amount of data would be cached multiple times. Also, multiple caches would consume a larger die area thereby increasing device costs. Accordingly, embodiments of the present invention share a texture cache between two texture pipelines. An example of an efficient dual pipeline sharing a cache that provides a configurable number of texels for configurable number of pixel quads is shown in the following figure.

Figure 4:
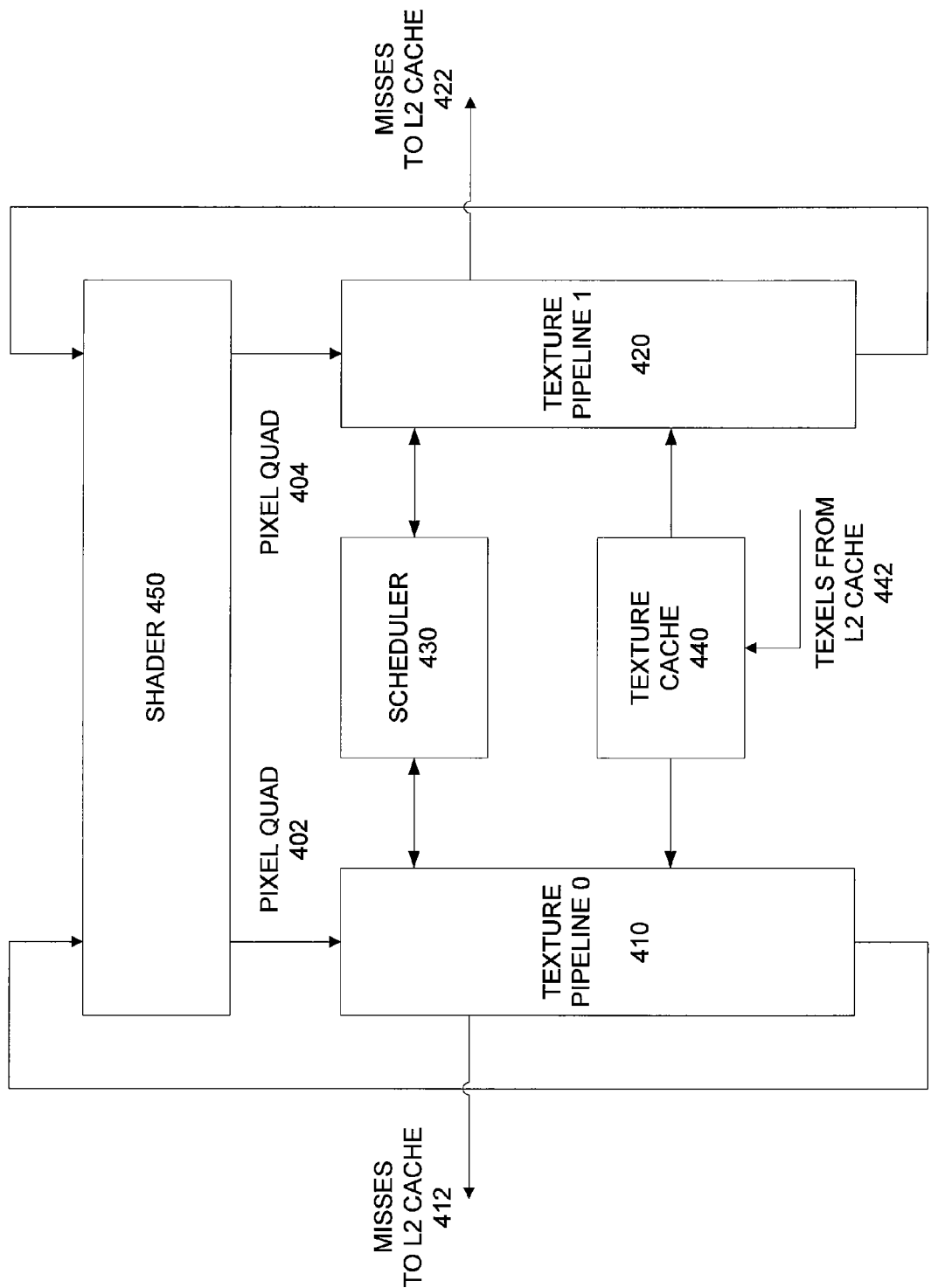
FIG. 4 is a block diagram of a dual texture pipeline sharing a texture cache according to an embodiment of the present invention.

FIG. 4 is a block diagram of a dual texture pipeline sharing a texture cache according to an embodiment of the present invention. This figure includes a shader 450, texture pipelines 410 and 420, scheduler 430, and texture cache 440. The shader 450 provides up to two pixel quads, one each on lines 402 and 404 to the texture pipelines 410 and 420. Typically, a pixel quad is provided each clock cycle on lines 402 and 404, though occasionally only one pixel (or no pixel) is provided during a clock cycle.

The pixels are analyzed by the scheduler 430, which determines the format and filtering for the texels needed to provide texture for the pixels. The scheduler provides the pixels to the texture pipelines 410 and 420 in a manner that tends to optimize the utilization of the texture cache 440. Miss requests are provided to an L2 cache (not shown) on lines 412 and 422. Texels are retrieved from the texture cache 440 and provided to the texture cache 440 on line 442. The texture pipelines 410 and 420 provide data back to the shader 450.

In this architecture, the two texture pipelines 410 and 420 share a texture cache 440. Alternately, each texture pipeline may utilize its own texture cache. But again, data is stored in the two texture caches tend to be redundant. Accordingly, it is more efficient in terms of area and device costs to share one texture cache 440 between the two texture pipelines 410 and 420.

Figure 5:
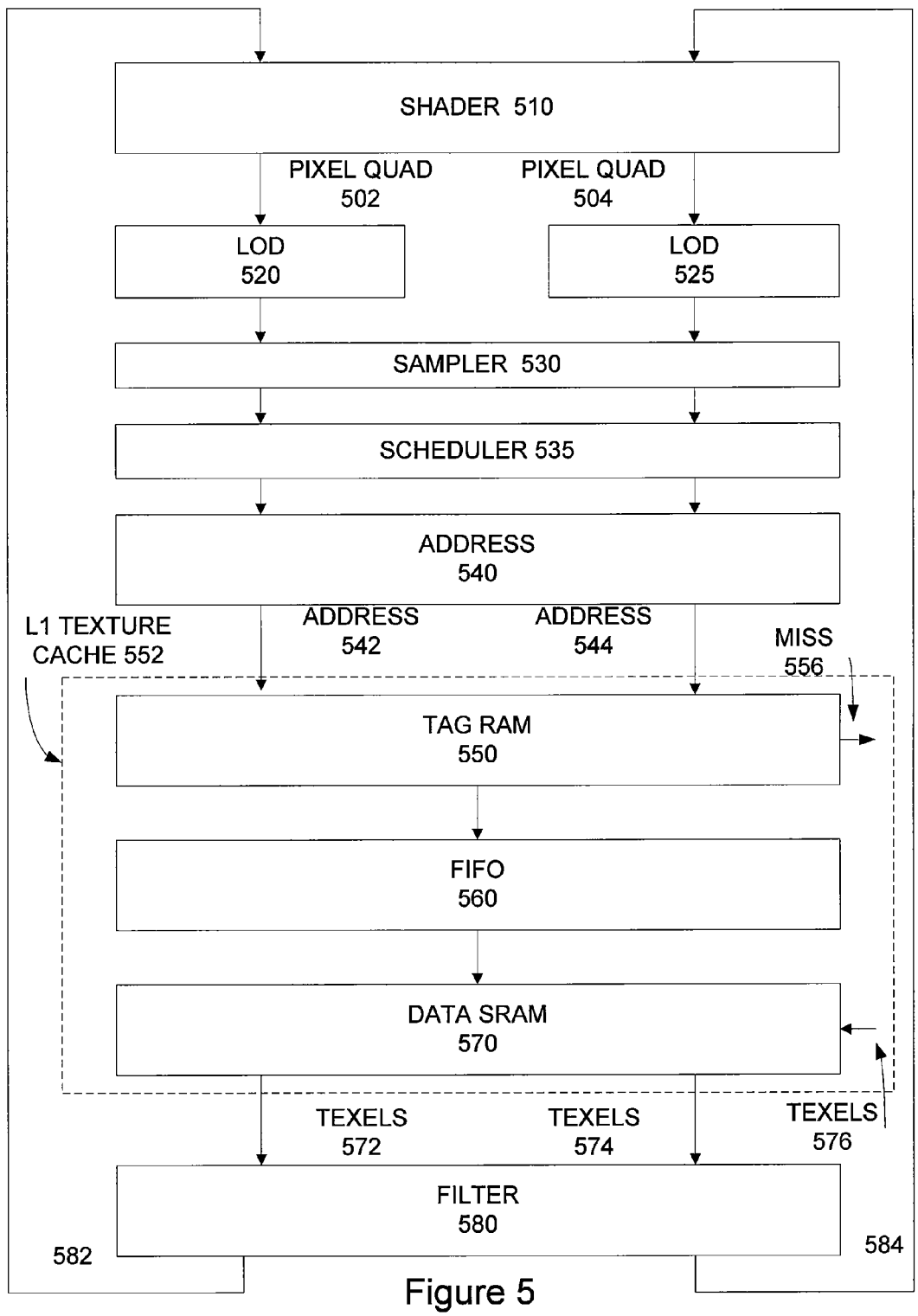
FIG. 5 is a more detailed block diagram of a dual texture pipeline sharing a texture cache according to an embodiment of the present invention.

FIG. 5 is a more detailed block diagram of a dual texture pipeline sharing a texture cache according to an embodiment of the present invention. This figure includes a shader 510, level of detail circuits 520 and 525, sampler 530, scheduler 535, address circuit 540, a level-one texture cache 552 including tag RAM 550, FIFO 560, and data SRAM 570, as well as a filter 580.

Pixel quads are received from the shader 510 on lines 502 504 by the level of detail circuits 520 and 525. In a specific embodiment of the present invention, up to one pixel quad could be received by each level of detail circuit 520 and 525 each clock cycle. The level of detail circuits 520 and 525 provide outputs to the sampler 530. The sampler communicates with a scheduler 535 that determines the texel format and needed type of filtering, that is, the scheduler determines the configuration of the texture pipelines. In particular, the scheduler determines the texel quads that will be retrieved, and for which pixels in which pixel quads they will be received for. The scheduler 535, in turn, provides an output to the address block 540. The address block 540 determines the addresses of texels needed by the pixel quads received above and provides them to the tag RAM 550.

The tag RAM 550 checks the addresses of the needed texels and determines whether they are stored in the data SRAM 570, or need to be retrieved from the level-two cache or graphics memory (not shown). If texels need to be retrieved from the level-two cache, a miss signal is provided on line 552, and retrieved texels are in turn received on line 572 from the level-two cache. The tag RAM 550 then provides the addresses to FIFO 560, which masks the latency of the return trip from the level-two cache, and from the frame buffer memory if needed. Outputs from the FIFO 560 are provided to the data SRAM 570. Texels are retrieved from the data SRAM 570 and provided to the filter 580 on lines 572 and 574. Texel quads are filtered by the filter 580, which provides outputs to the shader 510 on lines 582 and 584.

This and the other block diagrams may be altered in a manner consistent with embodiments of the present invention. For example, the filter 580 may be considered to be two filters, one in each texture pipeline. It should be noted that these are logically equivalent. Similarly, the address block 540 may be portrayed as two address blocks. Also, the boundaries between the various function blocks may be drawn in various ways and the blocks may have different names. Various embodiments of the present invention include additional blocks, while others have few blocks.

Again, convention texture pipelines are capable of providing one texel quad for each pixel in a pixel quad in one clock cycle; this data rate is referred to as four texel quads. Texture caches provided by a specific embodiment of the present invention are capable of providing up to eight texel quads per clock cycle. Embodiments of the present invention allow for the eight bilerps to be configured in different manners depending on the filtering needed, and the size of the individual texels. In situations where texels are comparatively large, fewer than eight texel quads may be provided each clock cycle.

Embodiments of the present invention typically employ an n-way set associative cache. This means that each memory address used for storing texels is assigned to a set, the set including "n" cache lines. Each memory address may be stored in any of these n-cache lines. To simplify cache design, typically only one cache line in a set may be read each clock cycle. It is therefore desirable to include a large number of sets, otherwise not enough cache lines may be read each cycle to provide a desired level of performance. Unfortunately, providing a large number of sets is expensive. Accordingly, a specific embodiment of the present invention utilizes eight sets in its texture cache, though other numbers of sets may be utilized by other embodiments of the present invention.

If texels in two or more cache lines in one set are needed, a set conflict occurs. When a set conflict occurs, requested cache lines in the set are read during different clock cycles. For example, if two cache lines in a set are requested, a first cache line is read during a first clock cycle and a second cache line is read during a second subsequent clock cycle. This can be achieved by serializing the addresses for cache lines in the same set. An example of a tag RAM circuit the can be used for this purpose is shown in the following figure.

Figure 6:
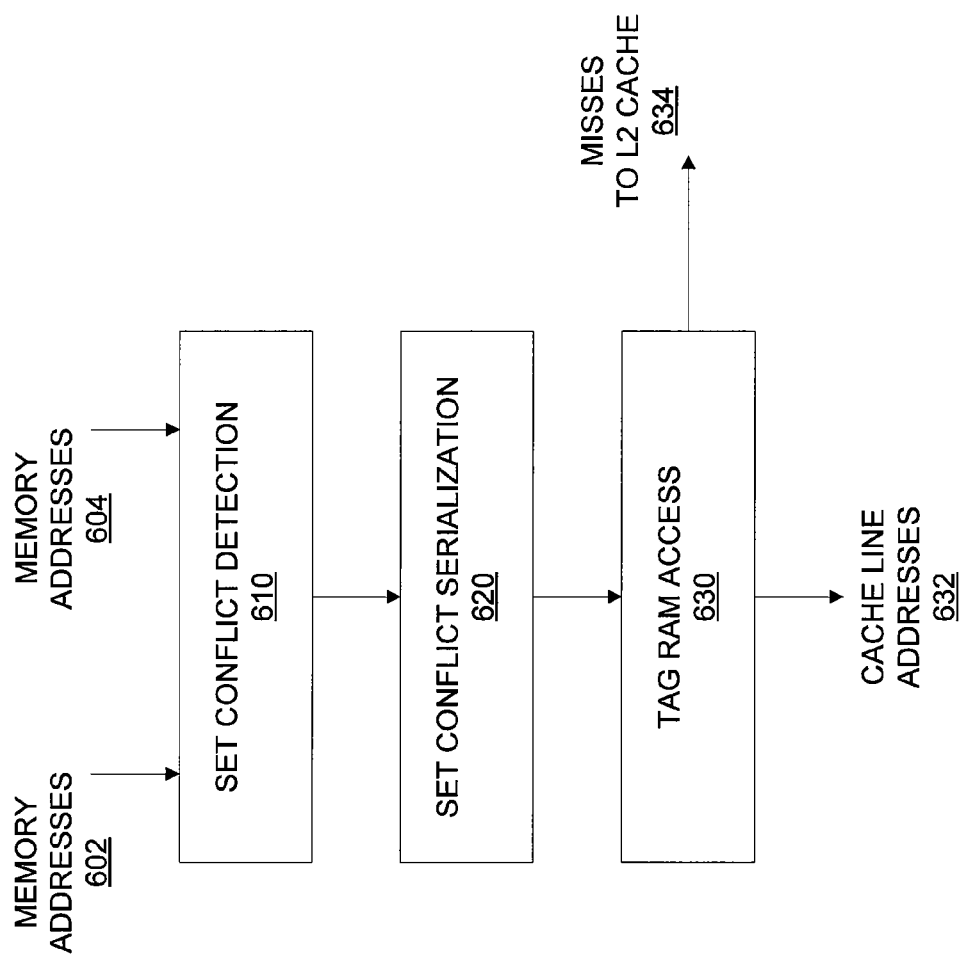
FIG. 6 is a block diagram of a tag RAM according to an embodiment of the present invention.

FIG. 6 is a block diagram of a tag RAM that may be used as the tag RAM 440 in FIG. 4. This tag RAM includes a set conflict detection circuit 610, set conflict serialization circuit 620, and tag RAM access circuit 630. Addresses are received from a first texture pipeline on line 602 and from a second texture pipeline on line 604. Set conflict detection circuit 610 determines whether a set conflict exists between two or more of the addresses. That is, the set conflict detection circuit 610 determines whether two or more cache lines in one set need to be addressed.

If there is one or more such conflicts in the addresses, the set conflict serialization circuit 620 serializes the addresses such the cache lines are retrieved during sequential clock cycles. For example, in a specific embodiment of the present invention, a 16-way set associative cache is used; accordingly, up to 16 cache lines in a set may need to be retrieved. Thus, in this embodiment of the present invention, set conflict serialization circuit 620 may serialize as many as 16 addresses for 16 different clock cycles.

Tag RAM access circuit 630 determines whether the needed texels are stored in cache or need to be retrieved from the level-two cache. A miss signal is provided to the level-two cache on line 634. Cache line addresses are provided to a FIFO (not shown) on line 632.

Typical embodiments of the present invention employ a texture cache SRAM that is arranged in a number of banks, where each bank is a single-port memory such that data at one address can be read from each bank each clock cycle. Since only one address can be read from each bank each clock cycle, if data at more than one address needs to be read from a bank, a bank conflict occurs. Accordingly, the reads to that bank are serialized and occur on different clock cycles. Specifically, if data at two addresses is needed from one bank, data at a first address is retrieved in a first clock cycle, while data at a second address is retrieved on a second subsequent clock cycle. In a specific embodiment of the present invention, eight bytes of data can be read each clock cycle. Depending on texel size, these eight bytes may include one or more texels. Also, to reduce memory bandwidth usage, texels may be compressed. When texels are compressed, these eight bytes may include several texels. Once read, these texels are decompressed for use by the filters. A block diagram of such a texture cache and associated circuitry is shown in the following figure.

Figure 7:
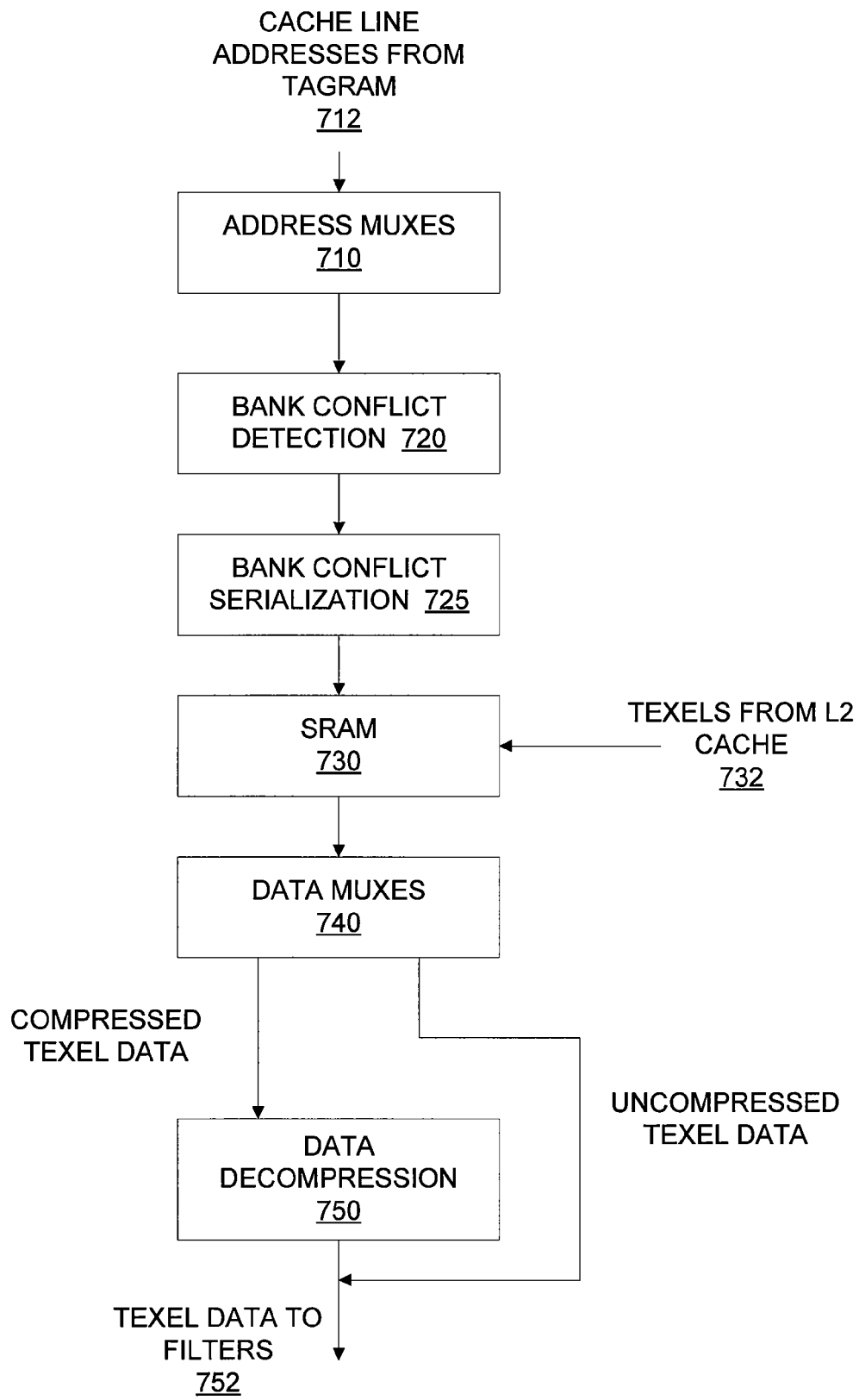
FIG. 7 is a block diagram of a texture cache and related circuitry according to an embodiment of the present invention.

FIG. 7 is a block diagram of a texture cache SRAM and related circuitry according to an embodiment of the present invention. This figure includes address multiplexers 710, bank conflict detection circuit 720, SRAM 730, data multiplexers 740, and data decompression circuit 750. Addresses are received from the tag RAM on line 712 by the address multiplexers 710. The address multiplexers multiplex addresses from the tag RAM to the individual banks that comprise the SRAM 730. These addresses are received by the bank conflict detection circuit of 720, which determines whether any conflicts arise, that is, whether two addresses are received for one bank.

If a conflict occurs, the conflicting addresses are serialized. This has a disadvantage that corresponding texels are retrieved in two clock cycles instead of one. Accordingly, texture cache lines provided by embodiments of the present invention are arranged in order to reduce the occurrence of bank conflicts.

Addresses are provided by the bank conflict detection circuit 720 to the SRAM 730. Texel data retrieved from the level 2 cache, which may in turn have come from the graphics memory, is received by the SRAM 730 on line 732. Texel data is retrieved from the SRAM 730 and multiplexed by the data multiplexers 740. The data multiplexers 740 sort data from the various banks of the SRAM 730 in to a proper order for use by the texture filters.

Again, in various embodiments of the present invention, texels may be stored in the SRAM 730 in a compressed format. If the texels are compressed, they are decompressed by the data decompression circuit 750, and provided to the texture filter on line 752. In one embodiment, a texel may be compressed to 4 bits in size. In this or other embodiments of the present invention, texels may be compressed to other sizes, such as 8 or 16 bits. In other embodiments, some texels may be compressed while others are uncompressed.

Several design choices are available for use in the SRAM 730. For example, a multi-port memory may be used. However, a multi-port memory requires overhead area and design complexity for each additional port. The additional area increases die costs for the circuit, while the additional complexity increases the design costs. Accordingly, in a specific embodiment of the present invention, a multitude of single read and write port memory banks are used.

Figure 8:
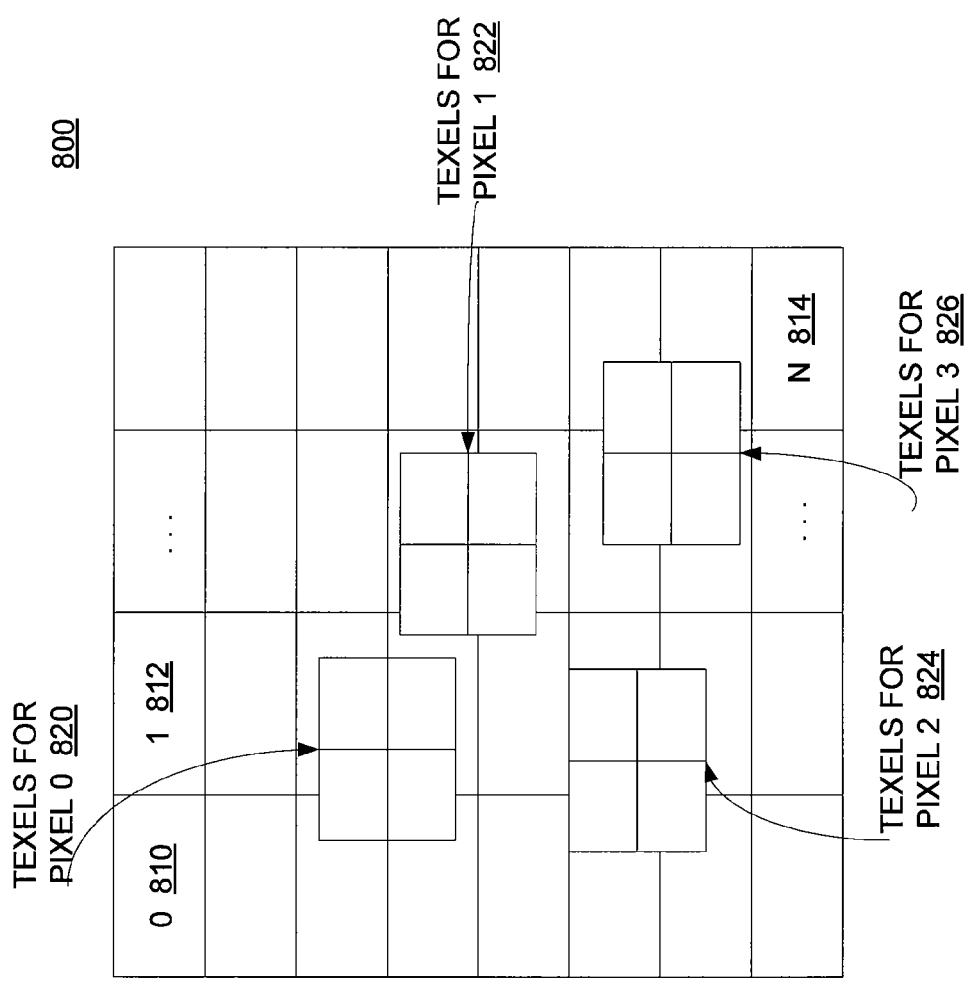
FIG. 8 is a diagram showing a configuration of a cache memory according to an embodiment of the present invention.

FIG. 8 is a diagram showing a configuration of a cache SRAM according to an embodiment of the present invention. This figure illustrates SRAM 730, which in this example includes "N" banks, specifically banks "0" 810 through "N" 814. Various texel quads 820 through 826 are shown for exemplary purposes. It should be noted that the texel quads are not necessarily drawn to scale.

In a specific embodiment of the present invention, 32 banks are used for a texture cache SRAM. Each bank includes one read port and one write port, each of which are eight bytes in width. Data is written to the banks as cache lines. Each cache line is distributed among 16 of these 32 banks. Specifically, each cache line is placed in one half of the banks, either the upper or lower 16 of the 32 banks. In this embodiment of the present invention, each cache line is written to one of 16 cache lines in a set, that is, a 16-way set associative cache is used, though other numbers of cache lines for each set may be used in other embodiments of the present invention. For example, 4, 8, 16, 20, 24, 30, 32, or other numbers of cache lines may be used for each set. In this specific embodiment, a cache line is 128 bytes in size, though in other embodiments of the present invention, other cache line sizes may be used. This specific embodiment of the present invention uses eight sets for its cache. That is, data at each higher-level memory address can be cached in one of eight sets. More specifically, data at each higher-level memory address can be cached in any one of the 16 cache lines in one of the eight sets.

Several factors can be considered when determining cache line size and the number of cache lines to be used. For example, a smaller size cache line reduces the required memory bandwidth. A smaller size cache line also increases the chance that data stored in a line will be needed, and reduces cache line thrashing; a larger size cache line by comparison reduces memory efficiency. However, a small cache line means a greater number of cache lines are needed, which requires more and larger tags in the tag RAM, increasing the cost of that circuitry.

Data is read from the banks. In the specific embodiment, eight bytes of data could be read each clock cycle from each of 32 banks, for a total of 256 bytes. Each bank is uniquely addressable during a read, that is, data from different cache lines can be read from each bank. Again, to support an eight-texel quad data rate, during each clock cycle, up to eight texels, two texel quads, can be read for each pixel in two pixel quads or four texel quads can be read for two pixels in a pixel quad. If the texels are comparatively large, fewer texel quads can be read, texel quads can be read for fewer pixels, or both.

The number of banks in the texture cache is also subject to several design tradeoffs. For example, having more banks reduces the frequency of bank conflicts. However, more banks increase the complexity of routing and related circuits, which increases device costs.

Also, the size of the texture cache itself is subject to tradeoffs. Providing extra cache lines allows cache lines to be allocated or reserved when a miss occurs in the tag RAM, thereby reducing the complexity of circuitry interfacing to higher levels of memory. Examples of this can be found in U.S. Pat. No. 6,629,188, titled "Circuit and Method for Prefetching Data for a Texture Cache," by Minkin et al, which is incorporated by reference. Unfortunately, a larger cache does increase die costs.

Under typical conditions, a quad of pixels maps into an area of texture space that is contained within an eight by eight array of texels. However, the alignment of the cache lines to the 8×8 array of texels is uncertain. Accordingly, six cache lines are needed to ensure that an 8×8 array of texels can be retrieved in one clock cycle. In a specific embodiment, eight cache lines are used.

Figure 9B:
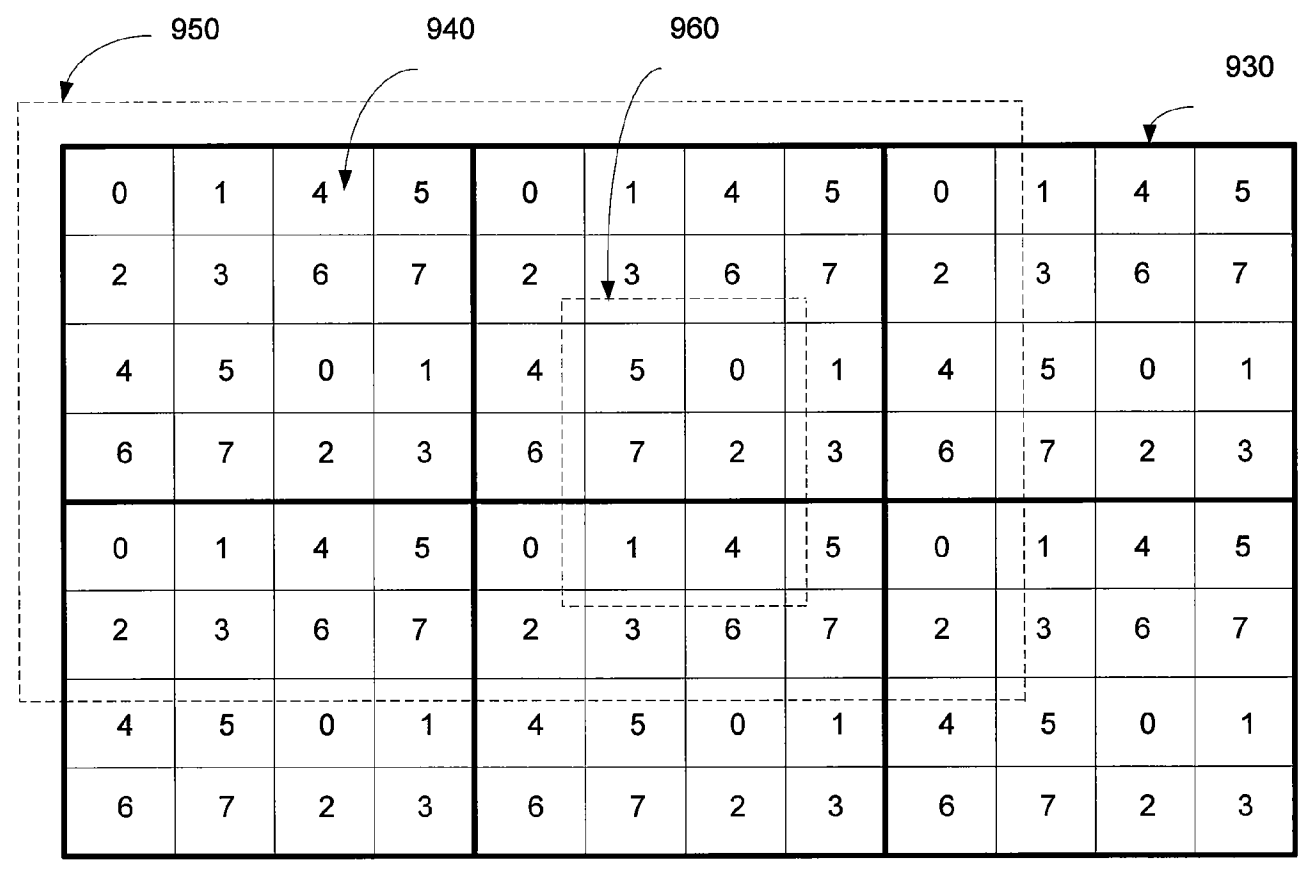

FIG. 9A illustrates cache line coverage of a texture space according to an embodiment of the present invention, while FIG. 9B illustrates the arrangement of sets in a texture cache according to an embodiment of the present invention. FIG. 9A includes an 8×8 array of texels from a texture space 910 and six cache lines 920. In this way, no matter the alignment of the array of texels to the cache lines, the cache lines cover the entire 8×8 array of texels, ensuring that, under normal conditions, all texels needed for a pixel quad are retrieved in one clock cycle.

Again, the texture cache is arranged to minimize set conflicts when texel data is read. The texture cache in one embodiment of the present invention is an n-way set associative cache, though in other embodiments of the present invention, direct mapped or fully associative caches can be used. Data at each memory address is assigned to one set in the cache. That data can be stored in any one cache line in the set of cache lines. In a specific embodiment of the present invention, a texture is stored in cache lines in the manner illustrated in FIG. 9B.

FIG. 9B illustrates an exemplary arrangement of cache lines in a cache memory according to an embodiment of the present invention. In this figure, a number of cache lines 940, in eight sets labeled zero through seven, are arranged in a pattern 930 such that set conflicts are avoided. In this example, each square labeled "0" corresponds to one cache line in set "0." The set allocation pattern is repeated across the whole texture.

Again, in a specific embodiment of the present invention, six adjacent cache lines are needed to ensure that an eight-by-eight array of texels can be read each clock cycle, in the absence of set or bank conflicts. This specific embodiment of the present invention uses the next higher number of cache lines that is a power of two, that is, it uses eight adjacent cache lines. Each one of the eight sets can provide one cache line each clock cycle. Accordingly, textures are distributed across sets such that each adjacent cache line comes from a different set.

As an example, a texture is stored in a subset 950 of the cache lines. An example of six adjacent cache lines 960 cover an eight-by-eight array of texels (not explicitly shown) in this texture. These six adjacent cache lines can be read in one clock cycle without incurring a set conflict. Specifically, cache lines from sets 5, 0, 7, 2, 1, and 4 can be read. Since no more than one cache line is read from any one set, no set conflict occurs. It can be seen that any six adjacent cache lines can be selected in this manner without creating a conflict.

Again, in a specific embodiment of the present invention, eight adjacent cache lines are read each clock cycle. In this example, cache lines in sets 3 and 6 can be read along with cache lines 960 without causing a conflict. It can also be seen that such a two-by-four array of adjacent cache lines can be read at any point in the texture cache without causing a set conflict. Specifically, for any placement of these adjacent cache lines, one cache line from each set zero through seven can be read each clock cycle, thereby avoiding set conflicts.

Again, embodiments of the present invention provide an increased number of texel quads per clock cycle as compared to conventional circuits. The texture cache pipeline is configurable in the manner that it retrieves these texel quads. That is, to avoid set and bank conflicts, different numbers of texel quads can be retrieved for different numbers of pixels. The numbers of texel quads and pixels can also be varied depending on texel size and the type of filtering to be performed. Below are tables illustrating the number of pixels processed per clock cycle and the number of pixel quads processed per clock cycle according to an exemplary embodiment of the present invention.

TABLE 1

Performance measured in average number of pixels per clock cycle:

| Texel size (Bits) | Bilinear | Iso-Trilinear | 2:1 Aniso | 4:1 Aniso | 8:1 Aniso |
|---|---|---|---|---|---|
| 4 | 8 | 4 | 4 | 2 | 1 |
| 8 | 8 | 4 | 4 | 2 | 1 |
| 16 | 8 | 4 | 4 | 2 | 1 |
| 32 | 8 | 4 | 4 | 2 | 1 |
| 64 | 4 | 2 | 2 | 1 | 0.5 |
| 128 | 2 | 1 | 1 | 0.5 | 0.25 |

TABLE 2

Performance measured in average number of pixel quads per clock cycle:

| Texel size (Bits) | Bilinear | Iso-Trilinear | 2:1 Aniso | 4:1 Aniso | 8:1 Aniso |
|---|---|---|---|---|---|
| 4 | 2 | 1 | 1 | 0.5 | 0.25 |
| 8 | 2 | 1 | 1 | 0.5 | 0.25 |
| 16 | 2 | 1 | 1 | 0.5 | 0.25 |
| 32 | 2 | 1 | 1 | 0.5 | 0.25 |
| 64 | 1 | 0.5 | 0.5 | 0.25 | 0.125 |
| 128 | 0.5 | 0.25 | 0.25 | 0.125 | 0.065 |

Texel size is listed in the left hand column. These texel sizes may be for compresses or uncompressed texels. For a specific embodiment of the present invention, compressed texels may have a size of 4 or 8 bits, while uncompressed texels may have any of the listed sizes. In other embodiments of the present invention, other sized compressed and other sized uncompressed texels may be used.

In the Table 1, the number of pixels for which texels are retrieved and filtered each clock cycle are listed for various types of filtering operations. In table 2, the number of pixels quads for which texels are retrieved and filtered each clock cycle are listed. These numbers are valid for a situation where there are no set or bank conflicts. If either set or bank conflicts exist, a greater number of clock cycles will be needed to retrieve the required texels. The values and filtering types listed here are for one specific embodiment of the present invention; other embodiments may have other values and employ other types of filtering.

Again, bilinear filtering requires one texel quad for each pixel. If pixels are 32 bits or smaller in size, one texel quad may be provided for each pixel in two pixel quads each clock cycle. In a specific embodiment of the present invention, a bilerp can filter texels with four components of eight bits each, or 32 bits in total. For higher resolutions, multiple bilerps can be combined. This configurability provides the capability of filtering higher resolution texels, though it comes at the expense of the total number of texels that can be filtered in a given number of clock cycles. For example, two bilerps can be combined to filter 64-bit texels. For these larger, 64-bit texels, one texel quad can be retrieved for four pixels in one pixel quad each clock cycle. Accordingly, two clock cycles are required to retrieve one 64-bit texel quad for each pixel in two pixel quads. These bilerps can be combined to filter even larger, higher resolution texels. For example, four bilerps can be combined to filter 128-bit texels. In other embodiments of the present invention, other sized texels can be filtered by combining other numbers of bilerps. For these larger 128-bit texels, one texel quad can be retrieved for two pixels in one pixel quad each clock cycle. Accordingly, four clock cycles are required to retrieve one 128-bit texel quad for each pixel in two pixel quads.

Both trilinear and 2:1 aniso filtering require two texel quads for each pixel. For trilinear filtering, for texels that are 32 bits or smaller in size, one texel quad can be retrieved for all four pixels in each of two pixel quads from texture cache memory each clock cycle; two clock cycles are needed to retrieve all texel quads. For 64-bit texels, one texel quad is retrieved for each pixel in one pixel quad each clock cycle, such that four clock cycles are required to retrieve the texels for all the pixels in two pixel quads. When the texels are larger still, 128 bits in this example, one texel quad is received for each of two pixels in one pixel quad, meaning eight clock cycles are required to retrieve all the necessary texel quads for the two pixel quads.

For 2:1 aniso ratios, for texels that are 32 bits or smaller in size, two texel quads can be retrieved for each pixel in one pixel quad from texture cache memory each clock cycle; such that two clock cycles are needed to retrieve all texel quads for two pixel quads. For 64-bit texels, two texel quads are retrieved for two pixels in one pixel quad each clock cycle, such that four clock cycles are required to retrieve the texels for all the pixels in two pixel quads. When the texels are larger still, 128 bits in this example, one texel quad is received for two pixels in one pixel quad, meaning eight clock cycles are required to retrieve all the necessary texel quads for all pixels in two pixel quads.

For 4:1 and higher aniso ratios, for texels sizes 32 bits or smaller, a specific embodiment of the present invention retrieves four texel quads for two pixels in one of two pixel quads each clock cycle. For larger texels, such as 64-bit texels, the number of pixels for which texel quads are retrieved is reduced to one, while for 128-bit texels, the number of texel quads retrieved for the pixel is reduced to two.

For aniso ratios, such as 2:1 or higher, more texel quads are needed than can be retrieved in a single clock cycle. For example, for a 2:1 aniso ratio, two texel quads are needed for each of eight pixels in two pixel quads, meaning 16 texel quads are needed each clock cycle. In this specific embodiment of the present invention however, eight texel quads are provided each clock cycle. Accordingly, either two texel quads can be retrieved for each of four pixels in a pixel quad, as outlined above, or two texel quads can be retrieved for two pixels in each of two pixel quads. As shown in the above table, for a 2:1 aniso ratio, a specific embodiment of the present invention retrieves two texel quads for each pixel in one pixel quad each clock cycle.

Figure 10B:
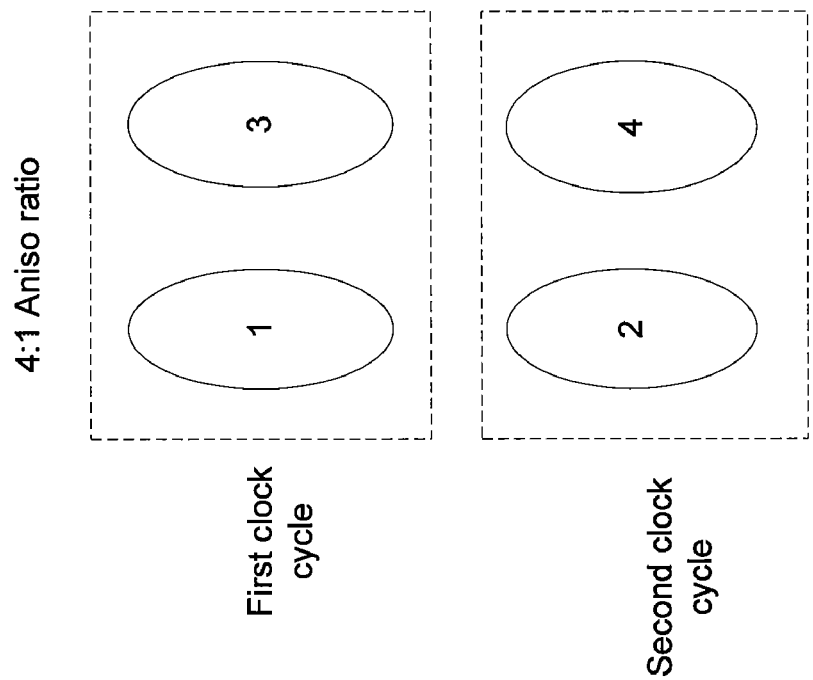
FIGS. 10A and 10B illustrate areas in a texture that provide texels for four pixels in a pixel quad.
Figure 10A:
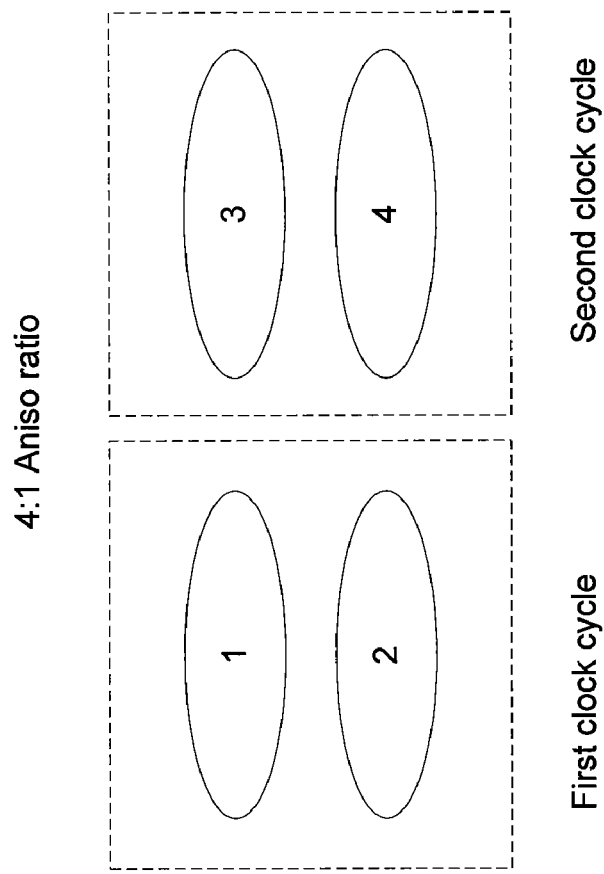

FIG. 10A illustrates areas in a texture that provide texels for four pixels in one pixel quad. Specifically, a first pixel, pixel 1, receives texture information from region 1. Region 1 in this example includes four texel quads. The same is true for regions 2, 3, and 4.

Again, embodiments of the present invention provide texture caches that are arranged such that retrieval of cache lines close in texture space proximity do not result in set or bank conflicts. Accordingly, to avoid set conflicts, during each clock cycle, it is desirable to read texel quads that are near each other. For this reason, texel quads in the left-hand regions 1 and 2 are read during a first clock cycle, while texel quads in right hand regions 3 and 4 are read during a second clock cycle.

In FIG. 10B, texels in four regions are again used to provide texture for four pixels. In this example, each major access has a vertical orientation, as compared to the horizontal orientation of FIG. 10A. Accordingly, texels in the top two regions 1 and 3 are retrieved during a first clock cycle, while those in regions 2 and 4 are retrieved during a second clock cycle. In a specific embodiment of the present invention, when the major axis has an angle between zero and 45°, texel quads are retrieved as shown in FIG. 10A, while when the major axis has an angle between 45 at 90°, texel quads are retrieved as shown in FIG. 10B. This principle can be extended to other aniso ratios.

Figure 11:
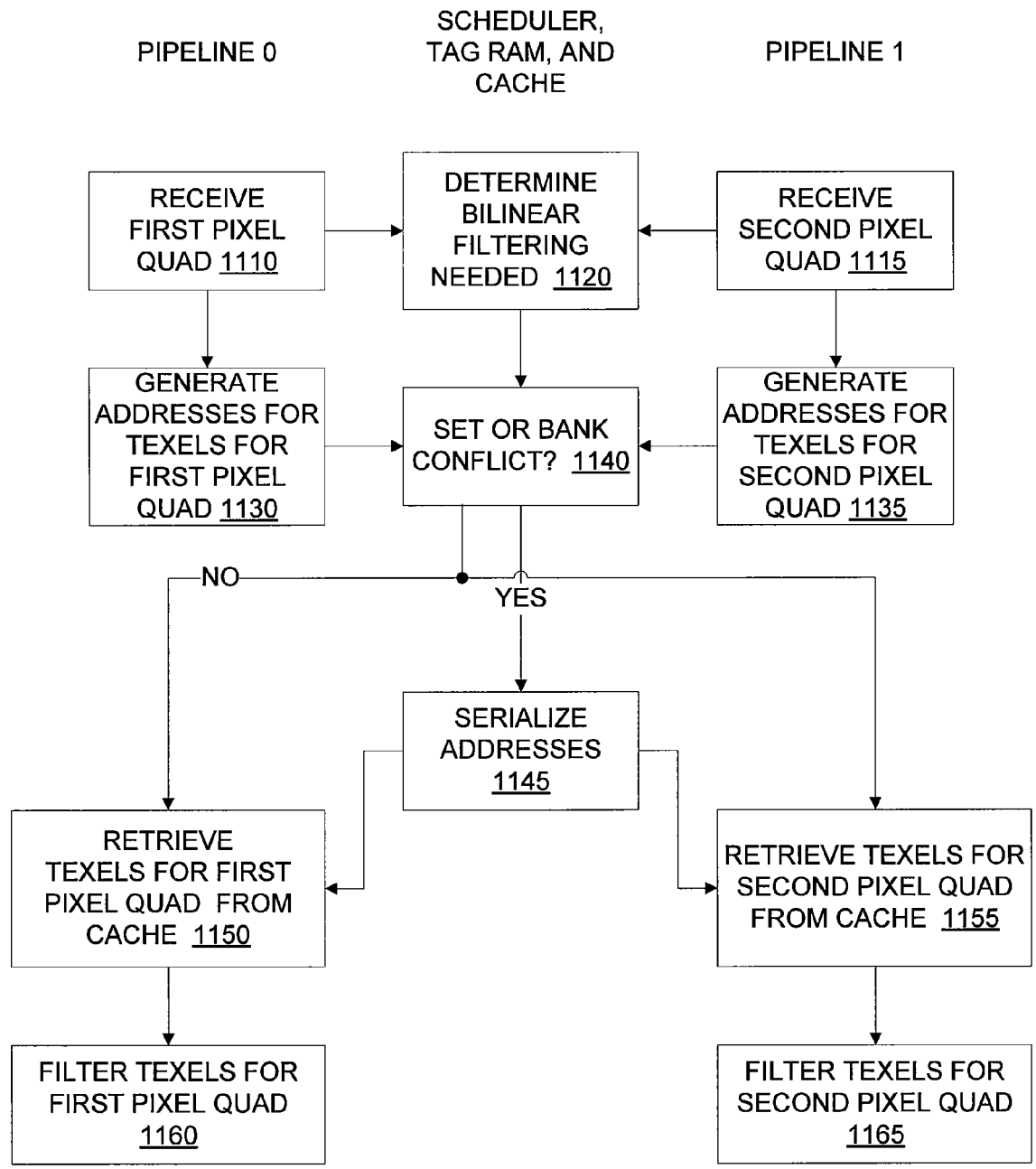
FIG. 11 is a flowchart illustrating a method of bilinear filtering according to an embodiment of the present invention.

FIG. 11 is a flowchart illustrating a method of bilinear filtering according to an embodiment of the present invention. In this and the following flowcharts, the functions performed by each of the pipelines as well as the scheduler, tag RAM, and cache are listed in corresponding columns. Also, in these flowcharts, the size of texel is relatively small, for example, 32 bits or less. If texels are larger, fewer texel quads may be retrieved for each pixel per clock cycle, texel quads may be retrieved for fewer pixels, or both.

In this flowchart, a texel quad for each pixel in a pixel quad is retrieved from a cache memory and filtered. Two pipelines, pipeline 0 and pipeline 1, share a common texture cache. Accordingly, before texels are retrieved, it is determined whether a set or bank conflict exists and whether the addresses corresponding to these texels need to be serialized.

Specifically, in act 1110, a first pixel quad is received by pipeline 0. In act 1115, a second pixel quad is received by pipeline 1. In act 1120, the scheduler determines that bilinear filtering is needed for both quads. In act 1130, pipeline 0 generates addresses for a first set of texels corresponding to the first pixel quad, while in act 1135, pipeline 1 generates addresses for a second group of texels corresponding to the second pixel quad.

In act 1140, the tag RAM determines whether there is a set conflict. If there is, the addresses are serialized in act 1145. Also, circuitry that addresses the cache determines whether there is a bank conflict. Again, if there is, addresses are serialized in act 1145. The texels for the first pixel quad are retrieved from texture cache in act 1150, while texels for the second pixel quad are retrieved from texture cache in act 1155. If the addresses have not been serialized, these texels can be retrieved in one clock cycle, thereby providing a 2:1 performance increase over conventional solutions. If the addresses are serialized in act 1145, the texels are retrieved from cache in two or more clock cycles, depending on the number of conflicting addresses. The texels for the first pixel quad are filtered in act 1160, while the texels for the second pixel quad are filtered in act 1165.

Again, on occasion the shader may provide only one pixel quad in a clock cycle. In this case, a texel quad can be provided for each pixel in the pixel quad that is received.

Figure 12:
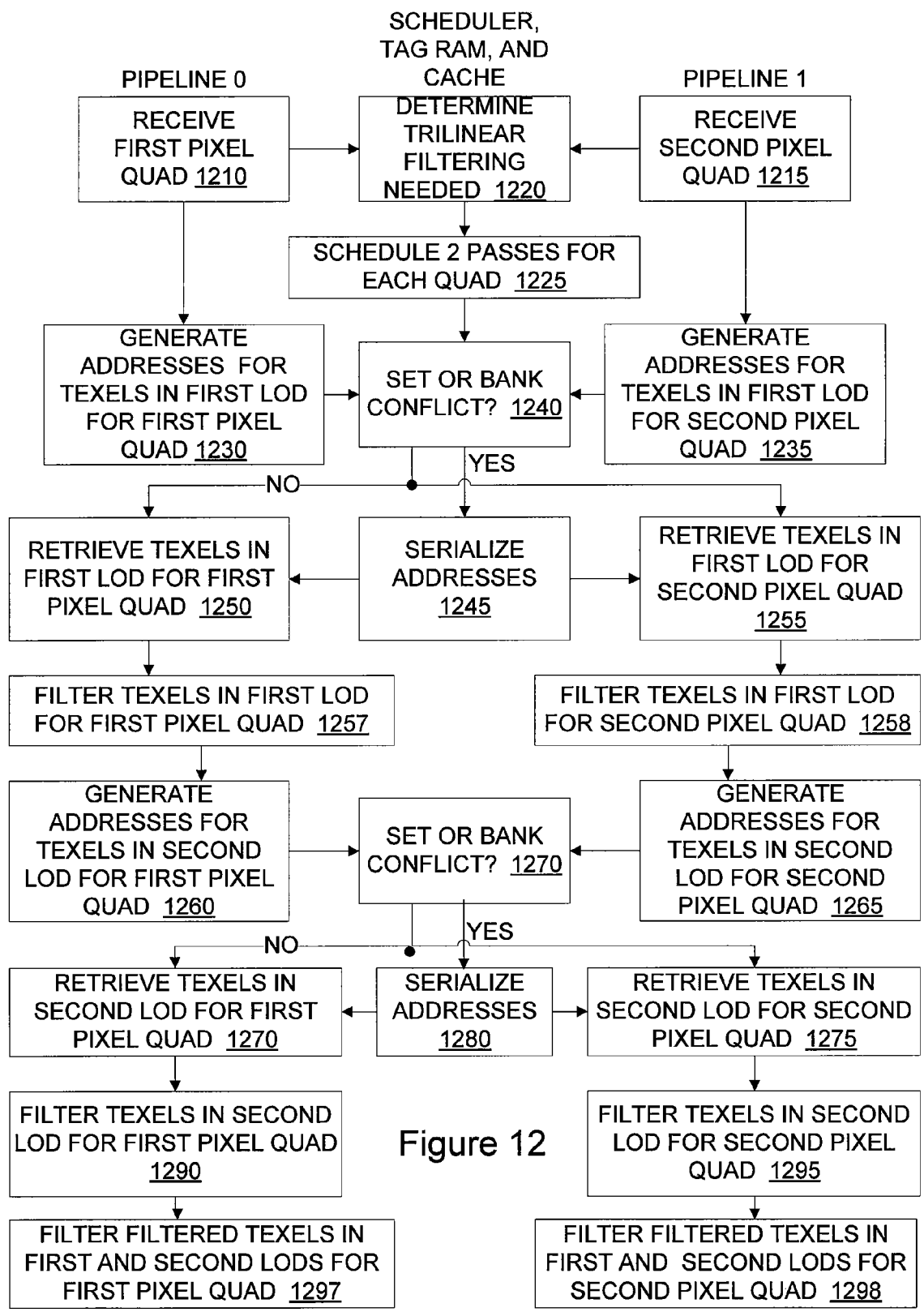
FIG. 12 is a flowchart illustrating a method of iso-trilinear filtering according to an embodiment of the present invention.

FIG. 12 is a flowchart illustrating a method of iso-trilinear filtering according to an embodiment of the present invention. In this method, trilinear filtering is done on two pixel quads. One option for trilinear filtering is to retrieve texels from two levels of details in one clock cycle for one pixel quad. This has the disadvantage in that bank conflicts often arise in this situation. Accordingly, in this specific embodiment, during one clock cycle, texels from a first level of detail are retrieved for two pixel quads, while in a second clock cycle, texels from a second level of detail are retrieved. In this way, bank conflicts are typically avoided and a performance gain can be achieved.

Specifically, in act 1210, a first pixel quad is received by pipeline 0. A second pixel quad is received in act 1250 by pipeline 1. In act 1220, it is determined that trilinear filtering is required for both of these pixel quads. In act 1225, two passes for each pixel quad are scheduled by the scheduler.

In act 1230 and 1235, addresses are generated for texels in a first LOD for the first and second pixel quads. In act 1240, it is determined whether there is a set or bank conflict. If there is, the addresses are serialized in act 1245. The texels are retrieved from texture cache in act 1250 and 1255 by each of the two pipelines. Again, if the addresses are not serialized, these texels can be retrieved in one clock cycle, while if there is a conflict and the addresses are serialized, these texels are retrieved in two or more clock cycles, depending on the number of conflicting addresses. In acts 1257 and 1258, the texels for the first and second pixel quads are filtered.

In act 1260 and 1265, the addresses for texels in a second LOD for the first and second pixel quads are generated. In act 1270, it is determined whether there is a set or bank conflict. If there is a conflict, the addresses are serialized in act 1280. Texels in the second LOD are retrieved for the first and second pixel quads from the cache in act 1270 and 1275, in one or more clock cycles as above. The texels are then filtered by the pipelines in acts 1290 and 1295. These filtered texels are then filtered with the filtered texels from acts 1257 and 1258 above.

The above flowchart contains the assumption that both pixel quads require texels from the same two LODs. In some cases, the pixel quads require texels from different LODs. For example, one pixel quad may need texels from a first and second LOD, while a second pixel quad may need texels from a third and fourth LOD. In such circumstances, on a first clock cycle, texels from the first and third LODs can be retrieved, while on the second, texels from the second and fourth can be retrieved. Alternately, on a first clock cycle, texels from the first and second LODs can be retrieved for the first pixel quad, while on the second, texels from the third and fourth can be retrieved for the second pixel quad. In either circumstance, bank conflicts are more likely, but overall performance is still improved.

As described above, occasionally only one pixel quad is provided by the shader in a clock cycle. In this case, texels from two levels of detail can be retrieved. Though on average this results in a lower performance gain, it provides more efficient performance than simply retrieving texels for one LOD.

Figure 13:
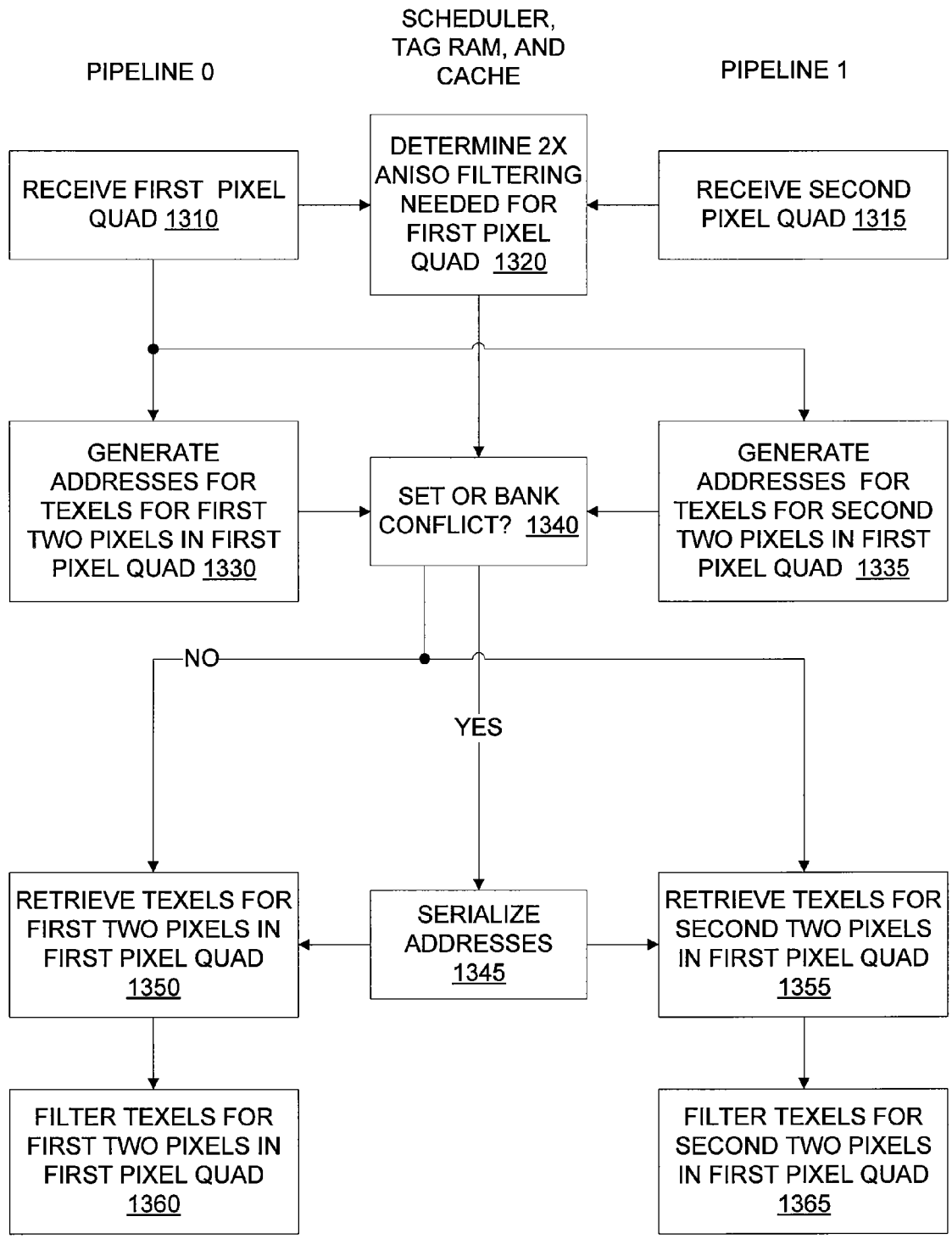
FIG. 13 is a flowchart illustrating a method of 2:1 aniso filtering according to an embodiment of the present invention.

FIG. 13 is a flowchart illustrating a method of 2:1 aniso filtering according to an embodiment of the present invention. In this method, two pixel quads are received. In this example, the first pixel quad requires 2:1 aniso filtering; the second pixel quad may need the same or another type of filtering. Texel quads are provided by the texture cache for each of the pixels in the pixel quad. For illustrative purposes, texels for two pixels in the first pixel quad are processed in each pipeline. In practical circuits, the two pipelines can be considered as being configured as one wider pipeline capable of processing texels for all four pixels in the first quad. In this way, 2:1 aniso filtering is done for four pixels in a pixel quad each clock cycle.

Specifically, in act 1310, a first pixel quad is received by pipeline 0, while in act 1315, a second pixel quad is received by pipeline 1. In act 1320, it is determined that 2:1 aniso filtering is needed for the first pixel quad. The filtering needed for the second pixel quad is not germane to this example. Accordingly, two pixels from the first pixel quad are scheduled to be processed by each of the pipelines. In act 1330, addresses for texels for the first two pixels in the first pixel quad are generated, while in act 1335, addresses for texels for the second two pixels in the first pixel quad are generated. In act 1340 it is determined whether there is a set or bank conflict. If there is, the addresses are serialized in act 1345. The texels are retrieved from the pixel cache in acts 1350 and 1355. The texels are filtered in act 1360 and 1365.

Again, on occasion, only one pixel quad is provided by the shader in a clock cycle. When this occurs, all four pixels in the pixel quad are passed to the pipeline and the appropriate texels retrieved, as outlined above.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit comprising:
   a first texture pipeline configured to receive a first plurality of pixels;
   a second texture pipeline configured to receive a second plurality of pixels; and
   a texture cache configured to provide texels to the first texture pipeline and the second texture pipeline,
   wherein the texture cache can provide a first number of texels for a second number of pixels in the first pipeline and a third number of texels for a fourth number of pixels in the second pipeline each clock cycle, and
   wherein the first number and the third number can be reconfigured depending on the second number, the fourth number, and a type of filtering to be performed on the first and third numbers of texels.

2. The integrated circuit of claim 1 wherein if 2× aniso filtering is needed, the texture cache can provide two texel quads to each of two pixels in each of the first and second pluralities of pixels in one clock cycle.

3. The integrated circuit of claim 1 wherein if bilinear filtering is needed, the texture cache can provide one texel quad to each of four pixels in each of the first and second pluralities of pixels in one clock cycle.

4. The integrated circuit of claim 1 wherein if trilinear filtering is needed, the texture cache can provide one texel quad from one level of detail to each of four pixels in each of the first and second pluralities of pixels in one clock cycle.

5. The integrated circuit of claim 1 wherein if trilinear filtering is needed, the texture cache can provide two texel quads, each from one level of detail, to each of four pixels in the first plurality of pixels in one clock cycle.

6. The integrated circuit of claim 1 wherein the integrated circuit comprises a graphics processor.

7. The integrated circuit of claim 1 wherein if 2× aniso filtering is needed, the texture cache can provide two texel quads to each of four pixels in the first plurality of pixels in one clock cycle.

8. An integrated circuit comprising:
a first texture pipeline to receive a first plurality of pixels;
a second texture pipeline to receive a second plurality of pixels; and
a texture cache to receive first addresses from the first texture pipeline and to provide first texels to the first texture pipeline to be filtered by the first texture pipeline, and to receive second addresses from the second texture pipeline and to provide second texels to the second texture pipeline to be filtered by the second texture pipeline,
wherein the texture cache can provide a first number of texels for a second number of pixels in the first pipeline and a third number of texels for a fourth number of pixels in the second pipeline each clock cycle, and
wherein the first number and the third number can be reconfigured depending on the second number, the fourth number, and a type of filtering to be performed on the first and third numbers of texels.

9. The integrated circuit of claim 8 wherein if 2× aniso filtering is needed, the texture cache can provide two texel quads to each of two pixels in each of the first and second pluralities of pixels in one clock cycle.

10. The integrated circuit of claim 8 wherein if bilinear filtering is needed, the texture cache can provide one texel quad to each of four pixels in each of the first and second pluralities of pixels in one clock cycle.

11. The integrated circuit of claim 8 wherein if trilinear filtering is needed, the texture cache can provide one texel quad from one level of detail to each of four pixels in each of the first and second pluralities of pixels in one clock cycle.

12. The integrated circuit of claim 8 wherein if trilinear filtering is needed, the texture cache can provide two texel quads, each from one level of detail, to each of four pixels in the first plurality of pixels in one clock cycle.

13. The integrated circuit of claim 8 wherein the integrated circuit comprises a graphics processor.

14. The integrated circuit of claim 8 wherein if 2× aniso filtering is needed, the texture cache can provide two texel quads to each of four pixels in the first plurality of pixels in one clock cycle.

* * * * *